United States Patent
Yamazaki

(10) Patent No.: US 6,560,357 B1
(45) Date of Patent: May 6, 2003

(54) COLOR CORRECTING METHOD AND IMAGE READING APPARATUS

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/324,659

(22) Filed: Jun. 3, 1999

(30) Foreign Application Priority Data

Jun. 3, 1998 (JP) .......................................... 10-154386

(51) Int. Cl.[7] ................................................ G06K 9/00
(52) U.S. Cl. ...................................... 382/167; 358/518
(58) Field of Search ........................ 382/167; 358/504, 358/521, 523, 518, 461; 356/421, 402, 405

(56) References Cited

U.S. PATENT DOCUMENTS

| | | | | |
|---|---|---|---|---|
| 5,280,354 A | * | 1/1994 | Nakamura | 358/168 |
| 5,452,112 A | * | 9/1995 | Wan et al. | 358/504 |
| 5,471,324 A | * | 11/1995 | Rolleston | 358/518 |
| 5,481,380 A | * | 1/1996 | Bestmann | 358/504 |
| 5,719,965 A | * | 2/1998 | Degi et al. | 382/254 |
| 5,918,192 A | * | 6/1999 | Tomaszewski | 702/85 |
| 6,002,498 A | * | 12/1999 | Haraguchi et al. | 358/518 |
| 6,075,888 A | * | 6/2000 | Schwartz | 382/167 |
| 6,134,029 A | * | 10/2000 | Granger | 358/504 |

* cited by examiner

Primary Examiner—Amelia M. Au
Assistant Examiner—Colin LaRose
(74) Attorney, Agent, or Firm—Birch, Stewart, Kolasch & Birch, LLP

(57) ABSTRACT

The color correcting method and the image reading apparatus estimate a spectral sensitivity characteristic of an image reading apparatus using a measured value obtained by measuring a reference original with a preset measuring instrument or a characteristic value of the reference original and a statistic calculated by analyzing an image signal value obtained by reading the reference original with the image reading apparatus, create an input color correction parameter from the estimated spectral sensitivity characteristic and correct an image signal of an original image read with the image reading apparatus using the input color correction parameter. As a result, according to the method and the apparatus, when the original image is photoelectrically read, the dispersion of the spectral sensitivities of scanners (image reading apparatus) can be preferably corrected, whereby images of high quality in which appropriate colors are reproduced can be stably reproduced in a digital photoprinter and the like.

17 Claims, 4 Drawing Sheets

COLOR CORRECTING METHOD AND IMAGE READING APPARATUS

BACKGROUND OF THE INVENTION

The present invention relates to the technical field of a color correcting method in which the dispersion of the spectral sensitivity characteristic of an image reading apparatus is corrected when an original image is photoelectrically read and appropriate colors can be reproduced in accordance with the original image. The invention also relates to the technical field of an image reading apparatus performing this color correcting method.

At present, most of the images recorded on photographic films such as negatives and reversals (which are hereinafter referred to as "films") are printed onto light-sensitive materials (photographic papers) by a technique generally called "direct exposure" (analog exposure) in which the light-sensitive materials are exposed with the light projected from the films.

In contrast, printers which adopt digital exposure have recently been commercialized. In this "digital photoprinter", the image recorded on a film is read photoelectrically and converted into digital signals, which are subjected to various kinds of image processing to produce recording image data; a light-sensitive material is scanned and exposed with recording light modulated in accordance with the image data, thereby recording a (latent) image which is then made to a (finished) print (photograph).

The digital photo printer is basically composed of a scanner (image reading apparatus) for photoelectrically reading images recorded on a film, an image processing apparatus for subjecting the image data read with the scanner or the image data supplied from a digital camera or the like to preset image processing and making the image data to image data for recording images, that is, setting exposure conditions based on the image data, a printer (image recording apparatus) for recording a latent image by scanning and exposing a light-sensitive material with, for example, a light beam in accordance with the image data output from the image processing apparatus, and a processor (developing apparatus) for subjecting the light-sensitive material having been exposed with the printer to development processing and for outputting prints on which the images are reproduced.

In the digital photoprinter, since an image can be made to digital image data and exposure conditions used in printing can be determined by subjecting the digital image data to image processing, prints of high quality, which cannot be obtained by the conventional direct exposure, can be obtained by preferably executing the correction of washed-out highlights and dull shadows due to photography with back light or an electronic flash, sharpening processing and the like. Further, a plurality of images can be composited to a single image or one image can be split into segments through the image processing. In addition, prints can be outputted after they are optionally subjected to editing and processing in accordance with the use of them.

Further, according to the digital photoprinter, not only images recorded on a film can be output but also prints, on which images recorded on a printed matter, a photograph and the like are reproduced, can be output by connecting a scanner (image reading apparatus) for reading a reflecting original to the digital photoprinter.

Incidentally, in the scanner of the digital photoprinter and the scanner for the reflecting original, reading light is incident on an original, and projected light, which has passed through the original (film), or reflected light, which has been reflected from the original, is read with an image sensor such as a CCD sensor or the like, thereby photoelectrically reading original images.

Further, the projected light and the reflected light of the original are processed with red (R), green (G) and blue (B) color filters or reading light processed with the R, G and B color filters is incident on the original, whereby the original images are read by being separated into the three primary colors R, G and B.

In the above situation, when scanners of the same type read the same original, they must obtain the same image signals (image data).

However, illuminants, color filters, image sensors and the like which are mounted on scanners are somewhat different from each other in the arrangement, quality and the like. As a result, each of the scanners has a spectral sensitivity characteristic particular to it even if they are of the same type. Accordingly, since resultant image signals reflect the spectral sensitivity characteristic of each scanner, images having different color tints are produced with each scanner even if visible images are reproduced using the image signals. Thus, appropriate colors cannot be always reproduced in accordance with the original, that is, an image of high quality cannot be always reproduced.

SUMMARY OF THE INVENTION

An object of the present invention is to solve the problem of the prior art and to provide a color correction method by which the dispersion of the spectral sensitivities of scanners caused by illuminants, color filters and the like (reading error caused by the dispersion) can be preferably corrected and uniform colors can be reproduced, and to provide an image reading apparatus making use of the color correction method.

DETAILED DESCRIPTION OF THE INVENTION

The color correction method and the image reading apparatus of the present invention will be described in detail with reference to preferred embodiments shown in the accompanying drawings.

Figure 1:
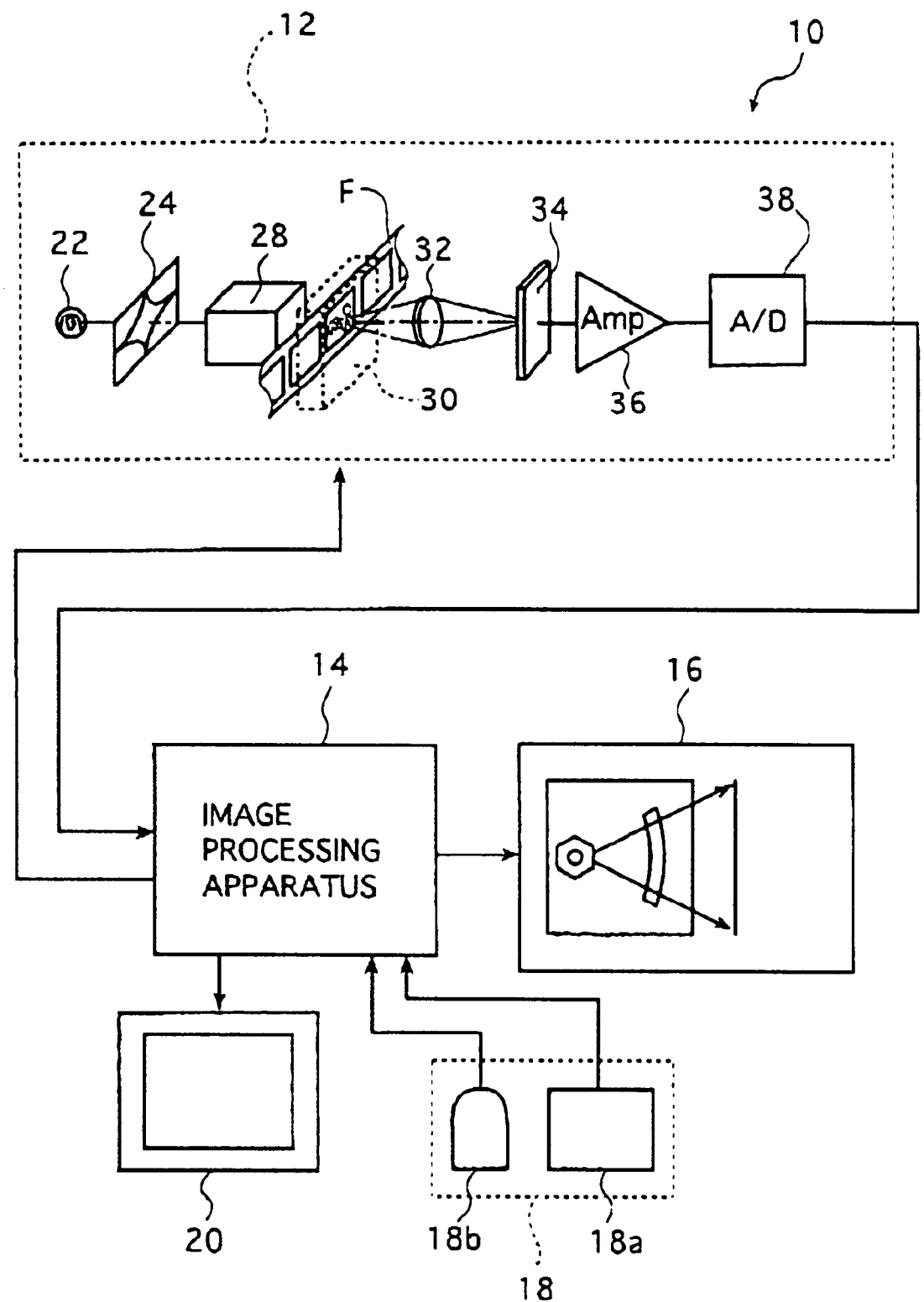
FIG. 1 is a block diagram of an embodiment of a digital photoprinter making use of the present invention.

FIG. 1 is a block diagram of an embodiment of a digital photoprinter making use of the present invention.

The digital photoprinter generally indicated by 10 in FIG. 1 (hereinafter referred to simply as the "photoprinter") basically comprises: a scanner (image reading apparatus) 12 which reads the image recorded on a film F photoelectrically; an image processing apparatus 14 which performs image processing of the thus read image data (image information), and which allows for manipulation, control and otherwise of the photoprinter 10 in its entirety; and a printer 16 which exposes a light-sensitive material (photograph paper) imagewise with optical beams modulated in accordance with the image data supplied from the image processing apparatus 14, develops the material and outputs it as a (finished) print. The scanner 12 and the image processing apparatus 14 relate to the present invention.

Connected to the image processing apparatus 14 are a manipulating unit 18 having a keyboard 18a and a mouse 18b to enter or set various conditions, to select and issue a command for a specific processing step and to enter commands for color/density correction and the like, as well as a display 20 which displays the image read with the scanner 12, various kinds of manipulative instructions, and screens on which various conditions are set and/or registered.

The scanner 12 is an apparatus for reading the image recorded or the film F or the like photoelectrically frame by frame. It comprises an illuminant 22, a variable diaphragm (stop) 24, a diffuser box 28 with which the reading light incident on the film F is made uniform on the plane of the film F, an imaging lens unit 32, an image sensor 34 which has line CCD sensors corresponding to the reading of respective R (red), G (green) and B (blue) images, an amplifier 36 and an A/D (analog to digital) converter 38.

The illustrated photoprinter 10 has dedicated carriers available which can be selectively mounted on the housing of the scanner 12 depending upon such factors as the type and size of films, for example, films for an Advanced Photo System and negatives (or reversals) of 135 size, the physical form of the films, e.g. whether they are a strip or a slide. By changing carriers, the photoprinter 10 is capable of handling and processing various kinds of films.

An image (frame) used to produce a print is transported to a preset reading position by the carrier.

In the scanner 12, when the image recorded on the film F is read, light emitted from illuminant 22 is adjusted in quantity through the variable stop 24, then is incident on the film F which is held at a preset reading position by a carrier, through which it is transmitted to produce projected light which carries the image recorded on the film F.

Figure 2A:
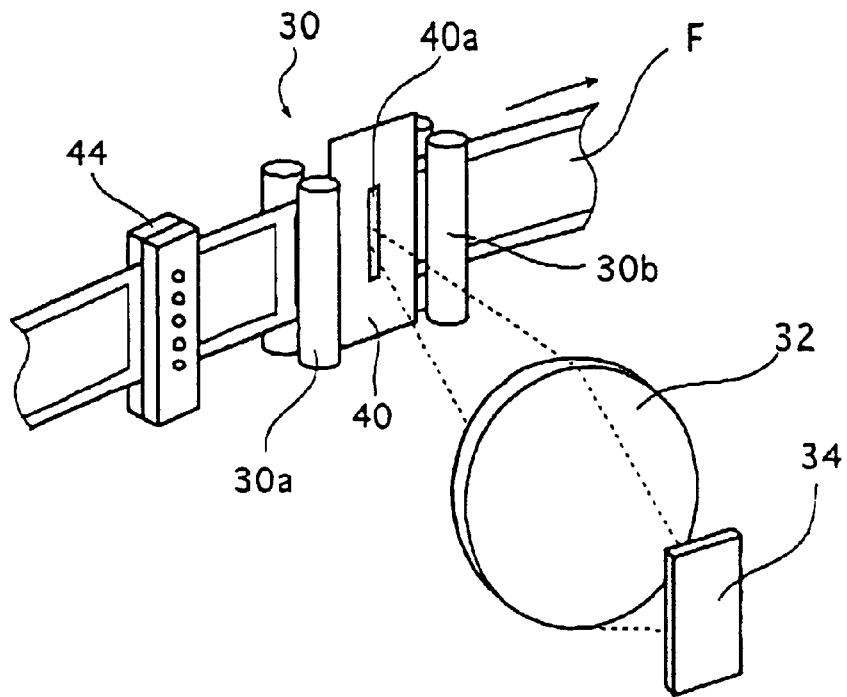
FIG. 2A is a conceptual view of an embodiment of a carrier set to the digital photoprinter shown in FIG. 1

As shown in FIG. 2A, the carrier 30 includes a pair of transport roller pairs 30a and 30b and a mask 40 having a slit 40a. The transport rollers pairs 30a and 30b are disposed on the opposite sides of a preset reading position in an auxiliary scanning direction. They transport the film F with its length being parallel to the auxiliary scanning direction which is perpendicular to a direction in which the line CCD sensors of the CCD sensor 34 extend (main scanning direction) while holding the film F at the preset reading position. The slit 40a defines the light projected from the film F so that the light has a preset slit shape, is located in registry with the reading position and extends in the main scanning direction.

Being held at the reading position by the carrier 30, the film F is illuminated with the reading light which is incident thereon while transported in the auxiliary scanning direction. Consequently, the film F is subjected to two-dimensional slit scan with the reading light through the slit 40a extending in the main scanning direction, whereupon the image of each frame recorded on the film F is read.

In the figure, numeral 44 denotes a code reader for reading bar codes which are optically recorded on the film F such as a DX code, expanded DX code, FNS code and the like and for reading various kinds of information recorded on the film F optically.

As described above, the reading light passes through the film F held by the carrier 30 and is made to the projected light which carries the image recorded on the film F. The projected light is processed with the imaging lens unit 32 and forms a focused image on the light receiving plane of the image sensor 34.

Figure 2B:
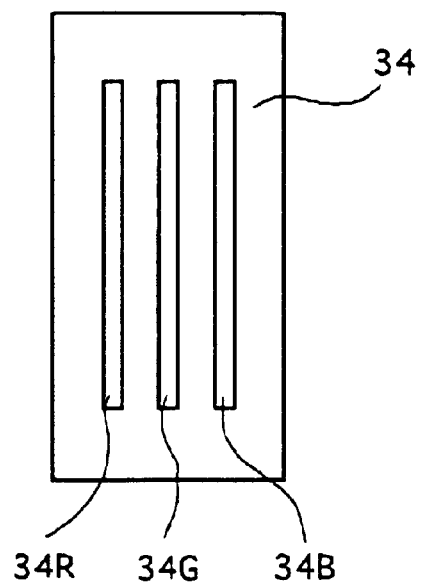
FIG. 2B is a conceptual view of an embodiment of an image sensor disposed to the digital photoprinter shown in FIG. 1; respectively

As shown in FIG. 2B, the CCD sensor 34 is a so-called 3-line color sensor comprising a line CCD sensor 34R for reading R image, a line CCD sensor 34G for reading G image, and a line CCD sensor 34B for reading B image. The respective line CCD sensors extend in the main scanning direction as described above. The light projected from the film F is separated into the three primary colors R, G and B by means of the image sensor 34 and read photoelectrically.

The output signals from the image sensor 34 is amplified with the amplifier 36, digitized to digital signals with the A/D converter 38 and thereafter sent to the image processing apparatus 14.

The scanner 12 reads the image recorded on the film F twice. That is, the scanner 12 carries out prescan for reading the image at a low resolution and fine scan for obtaining the output data of an output image.

The prescan is carried out under prescan reading conditions which are set beforehand to read the images of the entire film F to be read with the scanner 12 so that the image sensor 34 can read the images without being saturated. In contrast, the fine scan is carried out under fine scan reading conditions which are set to each image (frame) from prescan data so that the image sensor 34 is saturated at a density which is somewhat lower than the minimum density of each image (frame). Therefore, the output signals in the prescan and the output signals in the fine scan have a different resolution and a different output level even if the same image is scanned in them.

It should be noted that the scanner is by no means limited to a type that relies upon the slit scan described above but that it may make use of areal exposure by which the entire surface of the image in one frame is read at a time. In this case, for example, an area CCD sensor is used, a means for inserting R, G and B color filters is interposed between the illuminant 22 and the film F, and the image is read with the area CCD sensor by sequentially inserting the R, G and B color filters so as to separate the image recorded on the film F to the three primary colors.

The present invention is preferably applicable to a scanner for reading a reflecting original such as a printed matter, photograph and the like, in addition to the scanner for the film (transmission original) mentioned above.

All the known scanners can be used as the scanner for reading the reflecting original. For example, a slit scan scanner is exemplified as the scanner which obtains reflected light carrying an original image by two-dimensionally scanning an original with a bar-shaped reading illuminant and reading the image of the reflecting original by projecting the reflected light to an image sensor such as a CCD sensor or the like.

As described above, the digital image signals output from the scanner 12 is supplied to the image processing apparatus 14 (hereinafter, simply referred to as processing apparatus 14).

Figure 3:
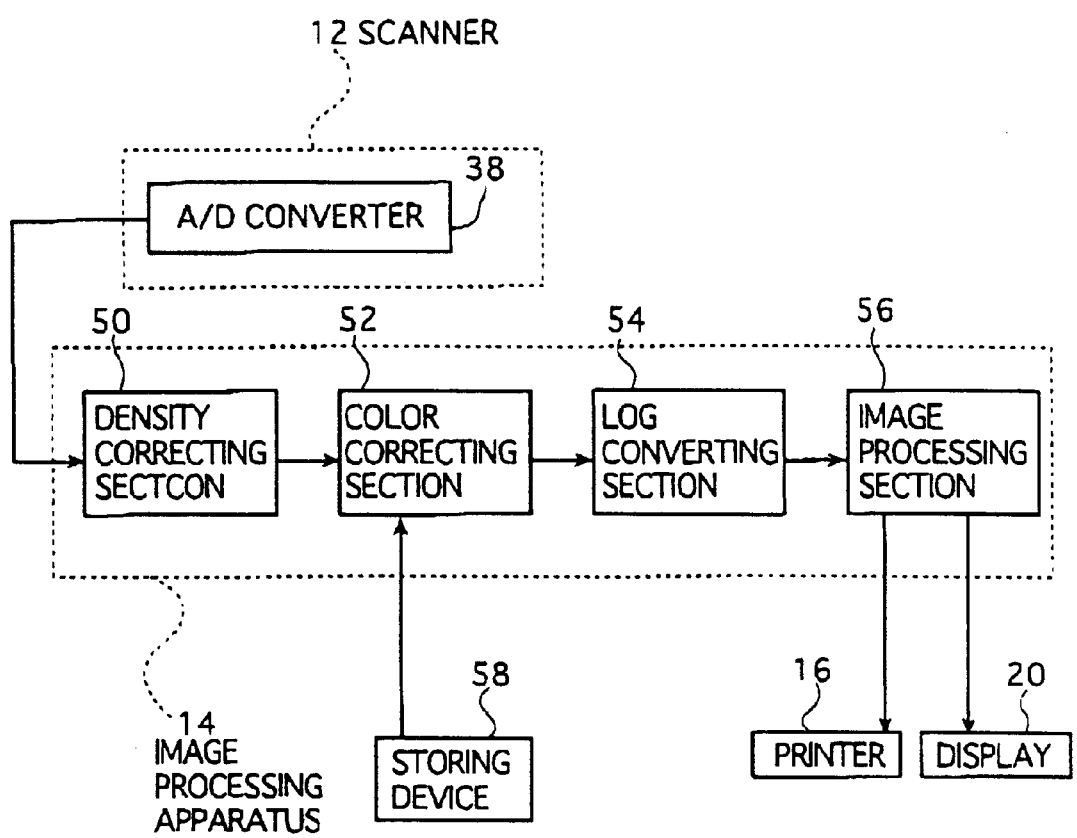
FIG. 3 is a block diagram of an embodiment of an image processing apparatus of the digital photoprinter shown in FIG. 2.

FIG. 3 shows a block diagram of the processing apparatus 14.

The processing apparatus 14 comprises a density correcting section 50, a color correcting section 52, a Log converting section 54 and an image processing section 56. FIG. 3 shows the sites which are related to image processing. In addition to the components shown in FIG. 3, the processing apparatus 14 includes a CPU which controls and manages the photoprinter 10 in its entirety including the processing apparatus 14, a memory which stores the information necessary for the operation of the photoprinter 10, and so forth. Further, the manipulating unit 18 and the display 20 are connected to the respective sections through the CPU and the like (CPU bus).

First, the R, G and B digital image signals which are output from the scanner 12 are subjected to corrections such as darkness correction, shading correction and the like in the density correcting section 50 so that preset image signals can be obtained from images having a prescribed density (hereinafter, referred to as density correction).

At this point, it is preferable that the scanner 12 which becomes a target of the color correction creates an input density correction parameter with respect to an image with an approximately constant reflection factor or transmission factor spectrally before the original image is read, and uses the thus created input density correction parameter under reading operation which reads the original image.

Next, the image signals are processed in the color correcting section 52, which is a section characteristic to the present invention, are made to digital image data in the Log converting section 54, subjected to preset image processing in the image processing section 56, and made to output image data corresponding to an image to be recorded with the printer 16 and to image data corresponding to an image to be displayed on the display 20.

The color correcting section 52 corrects the image signals in accordance with the spectral sensitivity characteristic of the scanner 12. That is, the dispersion of the spectral sensitivity of the scanner 12, which is caused by the illuminant 22, the color separating filters of the image sensor 34 and the like (reading error caused by the dispersion) so that an image whose color is appropriately reproduced in accordance with an original image can be obtained in such as the printer 16.

Figure 4:
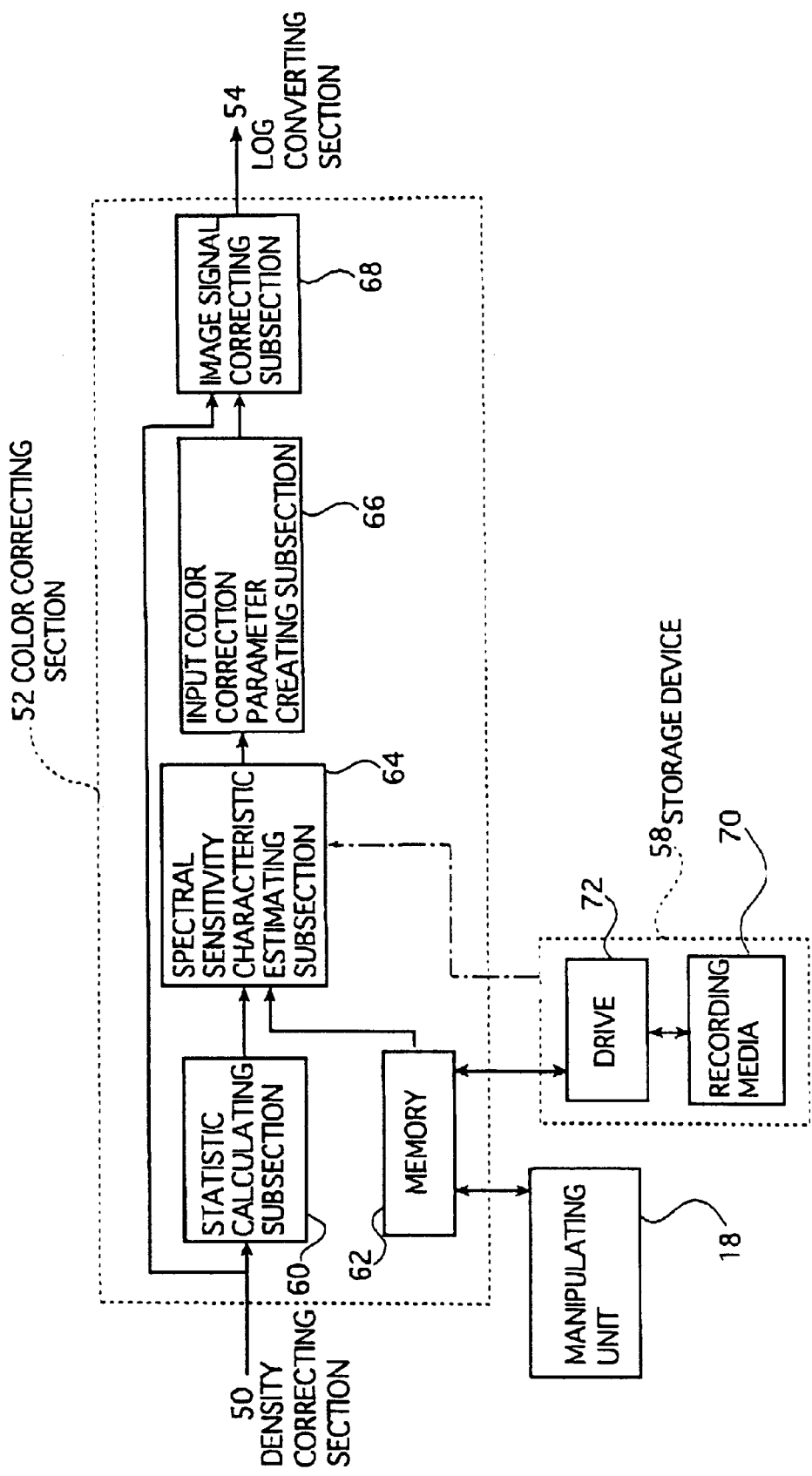
FIG. 4 is a block diagram of an embodiment of a color correction section of the image processing apparatus shown in FIG. 3.

As shown in FIG. 4, the color correcting section 52 comprises a statistic calculating subsection 60, an internal memory 62, a spectral sensitivity characteristic estimating subsection, an input color correction parameter creating subsection 66 and an image signal correcting subsection 68.

The correcting conditions used in the color correcting section 52 having such a construction, that is, an input color correction parameter well be basically created as shown below.

First, a reference original for creating the input color correction parameter is prepared and the image of the reference original is measured with a measuring instrument such as a spectrophotometer or the like. Thus, a measured value or a characteristic value of the reference original can be obtained. The measured value or the characteristic value is preferably stored in a recording media 70 which constitutes a storage device 58 that will be described later. This measured value or characteristic value is preferably spectral transmission factor of the reference original (spectral reflection factor in a case of a reflecting original).

The reference original may be any original so long as the spectral sensitivity of the scanner can be measured through it, and exemplified are reference originals, on which patches of various kinds of hues, patches of various kinds of saturation, or non-saturation patches of various kinds of densities are formed.

The reference original is more specifically exemplified by a transparent reference original such as a reversal film, negative film or the like with these patches formed thereon, color paper (color photographic paper) or a printed matter with these patches formed thereon or the like.

Moreover, the characteristic value of the reference original may use the measured value obtained by measuring this reference original with a specified measuring instrument or, otherwise, may use the characteristic value based on the specification employed when this reference original is produced.

Furthermore, this reference original is read with the scanner 12 and changed into a digital image signal by the A/D converter 38 which is then supplied to the color correcting section 52 after its density is corrected in the density correcting section 50. The image signal supplied to the color correcting section 52 is inputted to the statistic calculating subsection 60.

Next, the statistic calculating subsection 60 of the color correcting section 52 analyzes the image signal in a preset region (an image region positioned a predetermined location) of the reference original supplied thereto and calculates the statistic of the image signals. In the illustrated embodiment, the statistic is preferably provided after a difference derived from the optical systems of the measuring instrument and the scanner 12, specifically, a difference derived from flares and the like is corrected as a more preferable mode. The statistic calculated in such a manner is inputted in the spectral sensitivity characteristic estimating subsection 64.

While the information of the preset region of the reference original may be input by the operator, it is preferable that the information is stored in the storage device 58, for example, recording media 70 and then read together with the reference measured value or the reference characteristic value.

Although the statistic is not particularly limited, a mean value, median, integrated value and the like are preferably exemplified.

The color correcting section 52 captures in the internal memory 62 the measured value obtained by measuring the above-described reference original by means of the measuring instrument (hereinafter, referred to as reference measured value) or the characteristic value of this reference original (hereinafter, referred to as reference characteristic value).

A method of capturing the reference measured value or the reference characteristic value is not particularly limited and a method of inputting in the internal memory 62 by the operator through the keyboard 18a or the like of the manipulating unit 18 is also available. However, as a preferable example, the reference measured value or the reference characteristic value is stored in the storage device 58 and captured by being read therefrom. The storage device 58 is not particularly limited and may be composed of the recording media 70 and a drive thereof 72. That is, the recording media 70 such as a floppy disk or the like in which the reference measured value or the reference characteristic value is stored may be used so that the reference measured value or reference characteristic value is read out with a drive 72 disposed in the processing apparatus 14 and supplied to the internal memory 62 of the color correcting section 52. Otherwise, the storage device 58 may be composed of a memory device such as a hard disc, a RAM or the like built in the photoprinter 10 so that the reference measured value or the reference characteristic value may be stored in this storage device 58 and supplied to the internal memory 62 in the color correcting section 52 by being read out therefrom.

In the illustrated color correcting section 52, the captured reference measured value or reference characteristic value is once stored in the internal memory 62. However, the invention is not limited to the above and it may be directly inputted into the spectral sensitivity characteristic estimating subsection 64 by the operator through the manipulating unit 18 or the storage device 58.

Next, the spectral sensitivity characteristic estimating subsection 64 of the color correcting section 52 estimates the spectral sensitivity characteristic of the scanner 12 using the reference measured value or reference characteristic value captured by being read out from the internal memory 62 and the statistic calculated at the statistic calculating subsection 60.

The method of estimating the spectral sensitivity characteristic through the reference measured value or the reference characteristic value and the statistic is not particularly limited and various known methods can be used in accordance with the calculated statistic and the like can be used. However, for example, the following two methods are exemplified as being preferable.

As a first method, in the apparatus of the illustrated embodiment, a plurality of candidates of spectral sensitivity characteristics or a plurality of candidate parameters of spectral sensitivity capable of being captured by the scanner 12 (hereinafter, referred to as spectral sensitivity characteristic candidates) are previously set.

As to each of the spectral sensitivity characteristic candidates, the spectral sensitivity characteristic estimating subsection 64 of the color correcting section 52 calculates, using the reference measured value or the reference characteristic value captured, the image signals (hereinafter, referred to as read estimate) which the scanner 12 is estimated to obtain by reading the reference original if the scanner 12 has the spectral sensitivity characteristic candidate. Then, the color correcting section 52 calculates the statistic of the image signals.

Subsequently, the statistic, which is calculated at the statistic calculating subsection 60 from the image signals obtained by the scanner 12 when it actually reads the reference original, is compared with the statistic, which is calculated from the read estimate obtained by reading the reference original. In this manner, the spectral sensitivity characteristic candidate, from which a statistic having a minimum error (difference) can be obtained, is estimated (determined) as the spectral sensitivity characteristic of the scanner 12.

The read estimate obtained by reading the reference original may be previously determined and stored in the storage device of the scanner 12. At the time, the color correcting section 52 may not capture the reference measured value or the reference characteristic value.

As a second method, N pieces of matrices (in this case, N being an integer of 2 or more) for selecting spectral sensitivity are prepared as spectral sensitivity candidates. M pieces of image signals (in this case, M being an integer of 2 or more) obtained by reading the reference original are calculated using each of N matrices to further obtain a sum total of the errors (differences) between the thus calculated image signals and the reference measured value or the reference characteristic value matrix by matrix. Subsequently, by selecting the matrix by which the sum total becomes the minimum, the spectral sensitivity which the thus selected matrix represents can be selected. At this point, in obtaining the sum total of the errors (differences), higher precise selection can be performed by weighting to each reference measured value or each reference characteristic value.

The input color correction parameter creating subsection 66 of the color correcting section 52 corrects the dispersion of the spectral sensitivity of the scanner 12 from the spectral sensitivity characteristic thereof which is estimated as described above, and calculates an input color correction parameter for reproducing appropriate colors in an image which is reproduced from image signals. The thus calculated input color correction parameter is inputted from the input color correction parameter creating subsection 66 to the image signal correcting subsection 68. In the image signal correcting subsection 68, the image signal inputted from the density correcting section 50 is corrected using the inputted input color correction parameter.

Exemplified as the input color correction parameter is a parameter composed of one selected from or a combination of more than one selected from a one-dimensional matrix, a two-dimensional matrix and a three-dimensional LUT (lookup table) obtained by extending the two-dimensional matrix, further a parameter including a one-dimensional LUT in addition to the above parameter, a three-dimensional LUT obtained by combining the three-dimensional LUT with the one-dimensional LUT.

The method of calculating the input color correction parameter is not particularly limited and any known method may be used.

It is preferable that the input color correction parameter be created in the input color correction parameter creating subsection 66 in correspondence to each kind of the original and the image signal correcting subsection 68 of the color correcting section 52 corrects image signals using an input color correction parameter according to the original which is a target to be read.

For example, in the scanner 12 for reading the film F of the illustrated embodiment, it is preferable to create an input color correction parameter corresponding to each of negatives and reversals, and it is further preferable to create an input color correction parameter for each film maker, each grade of film and each kind of film.

Further, in the scanner for reading a reflecting original, it is preferable to create an input color correction parameter corresponding to each of a photograph (color paper; color photographic paper) and a printed matter (printed original). Further, it is more preferable to create an input color correction parameter according to each kind of photographic paper (photographic light-sensitive material), each print factory (ink, paper for printing use) and the like.

That is, in the present invention, the dispersion of spectral sensitivity in scanning is preferably corrected by estimating the spectral sensitivity characteristic of the scanner 12 using one reference original and creating the input color correction parameter using the spectral sensitivity characteristic, whereby an image of high quality in which uniform colors are reproduced are reproduced as well as input color correction parameters for various kinds of originals can be created by reading the one reference original.

As described above, in the invention, the reference original can use the transparent reference original such as the reversal film, negative film or the like, the reflecting original such as the color paper, the printed original or the like so that the reference original in accordance with the kind of the original which is the target to be read may be used. For example, using the reference original of the reversal film, the input correction parameter for the reversal film as well as the input correction parameter for the negative film can be created. Moreover, using the reference original of the color paper, the input correction parameter for color paper, the input correction parameter for the printed original as well as the input correction parameter for a three dimensional subject can also created.

The input color correction parameter need not be created (renewed) each time an image is read or each time the scanner 12 (photoprinter 10) is started up. That is, it is sufficient to create a new input color correction parameter only when the scanner 12 is shipped from a factory or when a component, which has a possibility to change the spectral sensitivity (color separation) characteristic of the scanner 12 is replaced or adjusted.

Specifically, a new input color correction parameter is created when the scanner 12 is shipped from the factory, when color filters which are disposed in a light path while an image is read with the scanner 12 are replaced, or when the color separation filters mounted on the image sensor 34 (respective color CCD sensors) are replaced.

In the above example, the input color correction parameter is calculated using the image signals, which have been subjected to the density correction such as the shading correction and the like in the density correcting section 50, and then the image signals, which have been processed in the density correcting section 50, are subjected to the correction in accordance with the spectral sensitivity characteristic of the scanner 12 in the color correcting section 52 as a preferable mode. However, the present invention is not limited thereto and, for example, the color correcting section 52 may be disposed upstream of the density correcting section 50.

When digital image data is read, it is often subjected to A/D conversion at a high gradation resolution of 12 bits or the like and converted into image data corresponding to image processing of 8 bit or the like through, for example, the Log conversion. However, it is preferable to calculate the input color correction parameter and to correct the image signals by means of the thus calculated parameter using image signals (including the image data having been subjected to the Log conversion) which have a gradation resolution higher than that of the image data subjected to the image processing executed in the image processing section 56, from the view point of accuracy and the like.

In the present invention, the image data having been subjected to the Log conversion is also included as the image signals. Accordingly, the above processing may be carried out using the image data, which has been subjected to the Log conversion, by disposing the color correcting section 52 downstream of the Log converting section 54.

As described above, the image signals read with the scanner 12 whose dispersion has been corrected in the color correcting section 52 is made to the digital image signals in the Log converting section 54, subjected to the preset image processing in the image processing section 56, further subjected to conversion processing in the 3D (three dimensional) LUT and the like and made to the image data corresponding to the image recording executed by the printer 16 or to the image data corresponding to the image display on the display 20.

The image processing carried out in the image processing section 56 is not limited, and various kinds of image processing executed in known image processing apparatuses are exemplified such as, for example, color balance adjustment, gradation adjustment, density adjustment, saturation adjustment, electronic magnification, dodging processing (compression/expansion of the dynamic range of densities), sharpness processing and the like. The processing can be carried out by a known means such as a LUT, matrix operation unit, filter, adder and the like or a means using averaging processing, interpolating operation and so on which are executed by suitably combining the above means.

Further, image processing conditions under which the image processing is carried out may be set by a known method by obtaining a density histogram, and an image characteristic amount such as, a mean density, maximum density and minimum density (density point at a preset frequency % of the density histogram), and so forth from the image data obtained in the prescan.

The printer 16 comprises a printing apparatus (recording apparatus) for exposing a light-sensitive material (photographic paper) in accordance with image data supplied from the image processing apparatus 14 and recording a latent image on the light-sensitive material and a processor (development apparatus) for subjecting the exposed light-sensitive material to preset processing and outputting it as a print.

In the print device, after the light-sensitive material is cut to a preset length in accordance with a print, information is back printed to each of the light-sensitive materials having been cut. Subsequently, three kinds of light beams for R exposure, B exposure and B exposure, which correspond to the spectral sensitivity characteristic of the light-sensitive material, are modulated in accordance with the image data supplied from the image processing apparatus 14 and deflected in the main scanning direction as well as each light-sensitive material is transported in the auxiliary scanning direction perpendicular to the main scanning direction. With this operation, each light-sensitive material is two-dimensionally scanned and exposed with the light beams and a latent image is recorded thereon. Then, each light-sensitive material is supplied to the processor. The processor, which has received each light-sensitive material, subjects it to preset wet development processing such as color development, bleach-fixing, rinsing and so forth and dries it. Then, the processor sorts and accumulates the respective light-sensitive materials as photographic prints corresponding to a preset unit such as one piece of film.

While the color correcting method and the image reading apparatus of the present invention have been described above in detail, the present invention is by no means limited to the above embodiment and it goes without saying that various improvements and modifications can be made within the range which does not depart from the gist of the invention.

As described above in detail, according to the present invention, when an image is photoelectrically read, the dispersion of the spectral sensitivities of scanners can be preferably corrected, whereby images of high quality in which appropriate colors are reproduced can be stably reproduced in a digital photoprinter and the like.

What is claimed is:

1. A color correcting method, comprising the steps of:
    correcting digital image signals output from an image reading apparatus to achieve a predetermined density;
    estimating a spectral sensitivity characteristic of the image reading apparatus using a measured value obtained by measuring a reference original with a preset measuring instrument or a characteristic value of the reference original and a statistic calculated by analyzing an image signal value obtained by reading the reference original with the image reading apparatus, wherein said predetermined density is achieved prior to estimating the spectral sensitivity characteristic;
    creating an input color correction parameter from the estimated spectral sensitivity characteristic; and correcting an image signal of an original image read with the image reading apparatus using the input color correction parameter.

2. The color correcting method according to claim 1, wherein said reference original is one of a reversal film, a negative film and a color photographic paper.

3. An image reading apparatus for photoelectrically reading an original image, comprising:

a reference original;

storing means for storing a measured value obtained by measuring the reference original with a preset measuring instrument or a characteristic value of the reference original;

calculation means for calculating a statistic by analyzing an image signal value obtained by reading the reference original;

estimation means for reading out the measured value or the characteristic value of the reference original from said storing means and for estimating a spectral sensitivity characteristic of the image reading apparatus from the measured value or the characteristic value read out from the storing means and the statistic calculated by said calculation means;

creation means for creating an input color correction parameter from the spectral sensitivity characteristic estimated by said estimation means; and correction means for correcting image signals obtained by reading the original image using the input color correction parameter created by said creation means, wherein said correction means includes a density correction subsection correcting digital image signals output from the image reading apparatus to achieve a predetermined density prior to estimating the spectral sensitivity characteristic.

4. The image reading apparatus according to claim 3, wherein said reference original is one of a reversal film, a negative film and a color photographic paper.

5. The image reading apparatus according to claim 3, wherein said estimation means estimates the spectral sensitivity characteristic by selecting a spectral sensitivity characteristic candidate having a minimum error from a plurality of previously set spectral sensitivity candidates using a statistic in which a difference derived from optical systems of said image reading apparatus and the measuring instrument is corrected.

6. The image reading apparatus according to claim 5, wherein said difference is derived from flare.

7. The image reading apparatus according to claim 3, wherein the input color correction parameter is created independently for each image type of the original image which is a target to be read.

8. The image reading apparatus according to claim 3, wherein said image signal value is an image signal value within an image region positioned at a predetermined location within the reference original.

9. The image reading apparatus according to claim 8, wherein said storing means stores an information of the predetermined location in the reference original and said estimation means reads out the information of the predetermined location in the reference original from the storing means.

10. The image reading apparatus according to claim 3, wherein said image signal value has a higher bit resolution than an ordinary image signal.

11. The image reading apparatus according to claim 3, wherein said measured value or said characteristic value is a spectral reflection factor or a spectral transmission factor.

12. The image reading apparatus according to claim 3, wherein said statistic is a mean value or a median value.

13. The image reading apparatus according to claim 3, wherein said input color correction parameter includes at least one of a one-dimensional matrix, a two-dimensional matrix and a three-dimensional lookup table obtained by extending the two-dimensional matrix.

14. The image reading apparatus according to claim 13, wherein said input color correction parameter further includes a one-dimensional lookup table.

15. The image reading apparatus according to claim 3, wherein a three-dimensional lookup table obtained by combining a three-dimensional lookup table extending a two-dimensional matrix and a one-dimensional lookup table is used as said input color correction parameter.

16. An image reading apparatus for photoelectrically reading an original image, comprising:

a reference original;

a CPU;

storing means for storing a measured value obtained by measuring the reference original with a preset measuring instrument or a characteristic value of the reference original;

calculation means for calculating a statistic by analyzing an image signal value obtained by reading the reference original;

estimation means for reading out the measured value or the characteristic value of the reference original from said storing means and for estimating a spectral sensitivity characteristic of the image reading apparatus from the measured value or the characteristic value read out from the storing means and the statistic calculated by said calculation means;

creation means for creating an input color correction parameter from the spectral sensitivity characteristic estimated by said estimation means;

correction means for correcting image signals obtained by reading the original image using the input color correction parameter created by said creation means, said correction means including a density correction subsection correcting digital image signals output from the image reading apparatus to achieve a predetermined density prior to estimating the spectral sensitivity characteristic, and wherein said density correction subsection creates an input density correction parameter with respect to the original image or the reference original with a spectrally, approximately constant reflection or transmission factor is created before the original image or the reference original is read and the thus created input density correction parameter is used under reading operation in which the original image or the reference original is read.

17. The image reading apparatus according to claim 16, said correction means further including a statistic calculating subsection; an internal memory, a spectral sensitivity characteristic estimating subsection, an input color correction parameter subsection and an image signal correcting subsection.

* * * * *